(No Model.)
F. H. PRENTISS.
AUTOMATIC SPRINKLER.
No. 306,352. Patented Oct. 7, 1884.
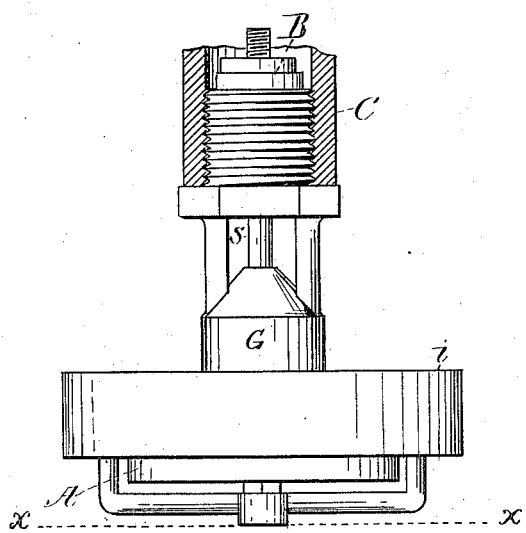
Fig-1-
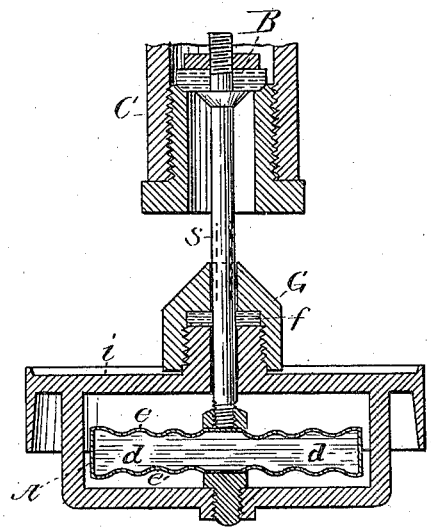
Fig-2-
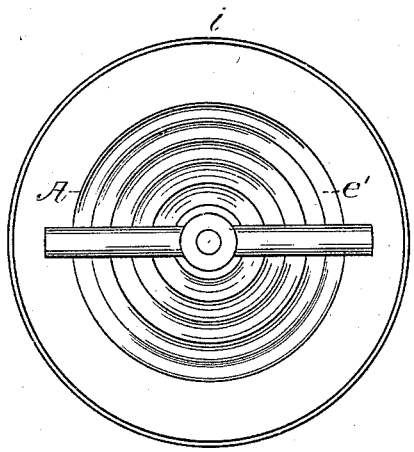
Fig-3-
WITNESSES
L. C. Southard.
L. H. Bateman.
INVENTOR
Frederick H. Prentiss

United States Patent Office.

FREDERICK H. PRENTISS, OF BOSTON, MASSACHUSETTS, ASSIGNOR TO THE AUTOMATIC FIRE ALARM ASSOCIATION, OF SAME PLACE.

AUTOMATIC SPRINKLER.

SPECIFICATION forming part of Letters Patent No. 306,352, dated October 7, 1884.

Application filed July 28, 1883. (No model.)

*To all whom it may concern:*

Be it known that I, FREDERICK H. PRENTISS, a citizen of the United States, residing at Boston, in the county of Suffolk and Commonwealth of Massachusetts, have invented certain new and useful Improvements in Automatic Sprinklers, of which the following, with the accompanying drawings, is a specification.

The first part of my invention relates to improvements in automatic sprinklers in which the valve in the water-pipe is connected with a flexible diaphragm in a pressure-generator containing a volatile liquid, or liquid holding gas in solution, which will operate said valve when the contents of the generator are acted upon by heat.

The second part of my invention relates to the use of a volatile liquid in a pressure-generator for the purpose of operating a valve in the water-pipe of an automatic sprinkler; and the object of my invention is to open a valve in the water-pipe, which will permit the water to flow through and out of the pipe whenever the temperature of the atmosphere surrounding the pressure-generator reaches a predetermined degree, and to close said valve when the temperature of said surrounding atmosphere is reduced below the degree at which the said valve opened.

Similar letters refer to similar parts in the drawings.

Figure 1 shows an elevation of my invention, of which Fig. 2 is a vertical section. Fig. 3 is a plan through lines $x$ $x$, Fig. 1, viewed from the bottom.

For the purposes of this specification I term the vessel A a "pressure-generator." The said vessel is constructed to contain and confine a volatile liquid which will exert a pressure upon the flexible diaphragm $e$, which will be communicated to the valve B through the valve-stem $s$, so that the valve B in the water-pipe C (drawn in vertical section) will thereby be lifted from its seat whenever the temperature of the atmosphere surrounding the vessel A is a few degrees above the boiling-point of the said liquid. The said pressure-generator should be made so tight that the contents thereof will not escape therefrom even when the liquid is vaporized. When the valve B is raised from its seat, the water escaping from the pipe C will strike upon the deflector $i$, so as to fall in a shower. The deflector $i$ serves also to protect the generator from the water, which might otherwise have the effect of cooling the liquid. $f$ is an elastic packing in the stuffing-box G, which may be compressed so as to increase the friction upon the valve-stem, and thereby regulate the action of the valve, which is accomplished by screwing the deflector $i$ upward. The movement of the valve may be increased by placing a diaphragm in the bottom of the generator, as shown in $e'$. The liquid contained in the generator is shown by the broken lines $d$ $d$. The said liquid may be any suitable liquid that will exert a pressure sufficient to give a movement to the diaphragm when exposed to heat; but I prefer to use a volatile liquid which will take the form of vapor when the temperature of the surrounding atmosphere reaches the boiling-point of the liquid, for the reason that the vapor of the volatile liquid exerts per square inch a pressure of a few pounds in excess of the atmospheric pressure at a few degrees above the boiling-point of the liquid, so that the temperature at which the valve will open and close may be determined by the properties of the saturated vapor of the volatile liquid used—that is to say, the action of the sprinkler will depend upon the relation between the temperature of the saturated vapor and its tension, and as this relation depends upon the character of the particular volatile liquid used, the adjustment at which a sprinkler may be made to operate may be varied by varying the volatile liquid. Therefore, when the sprinkler is adjusted to operate at a certain temperature, the valve B will open against the pressure of the water in the water-pipe C as soon as that degree of temperature in the atmosphere surrounding the generator is reached, and when the temperature of the surrounding atmosphere is reduced below the degree at which the valve was opened the valve will be automatically closed.

Liquid holding gas in solution may be used in the generator without departing from my invention. If such liquid is used, the action of the valve may be governed by the strength of the solution—that is to say, by the quantity of gas held in solution.

I endeavor to show my device in as compact form as possible; but the same may be varied without departing from my invention.

I claim—

1. In an automatic sprinkler, the combination of the pressure-generator A, provided with the flexible diaphragm e, the valve-stem s, the valve B, and the pipe C, substantially as described, for the purposes set forth.

2. The combination, in an automatic sprinkler, of a pressure-generator containing a volatile liquid, and provided with a flexible diaphragm fixed in the pressure-generator, with a valve in a water-pipe connected with said diaphragm, substantially as shown, for the purposes set forth.

3. The combination, in an automatic sprinkler, of the pressure-generator A, containing a volatile liquid, and provided with the diaphragm e, the valve-stem s, the valve B, the water-pipe C, and the deflector i, substantially as described, as and for the purposes set forth.

4. An automatic sprinkler arranged substantially as shown, having a pressure-generator into which is fixed a flexible diaphragm connected with a valve in a water-pipe, said pressure-generator being constructed so that its contents cannot escape therefrom, and containing a liquid that will operate said valve at a given temperature, as and for the purposes set forth.

FREDERICK H. PRENTISS.

Witnesses:
L. C. SOUTHARD,
L. H. BATEMAN.